US011230172B2

(12) United States Patent
Nellen et al.

(10) Patent No.: US 11,230,172 B2
(45) Date of Patent: Jan. 25, 2022

(54) ROOF ASSEMBLY FOR A VEHICLE AND A METHOD OF ASSEMBLING

(71) Applicant: Inalfa Roof Systems Group B.V., Oostrum (NL)

(72) Inventors: Marcel Johan Christiaan Nellen, Merselo (NL); Ruud Geurts, Helden (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/012,762

(22) Filed: Sep. 4, 2020

(65) Prior Publication Data

US 2021/0070155 A1 Mar. 11, 2021

(30) Foreign Application Priority Data

Sep. 10, 2019 (EP) ..................................... 19196379

(51) Int. Cl.
*B60J 7/057* (2006.01)
*E05F 15/643* (2015.01)
*B62D 65/06* (2006.01)

(52) U.S. Cl.
CPC ............ *B60J 7/0573* (2013.01); *B62D 65/06* (2013.01); *E05F 15/643* (2015.01);
(Continued)

(58) Field of Classification Search
CPC ............ E05F 15/643; E05Y 2201/434; E05Y 2201/654; E05Y 2201/684; E05Y 2600/45;
(Continued)

(56) References Cited

U.S. PATENT DOCUMENTS 3,874,722 A 4/1975 Pickles
4,390,203 A 6/1983 Lutz et al.
(Continued)

FOREIGN PATENT DOCUMENTS

DE 3442600 A1 5/1986
DE 3536184 C1 11/1986
(Continued)

OTHER PUBLICATIONS

Gerdes, "Motor vehicle and method of assembling the same: Arrangement For Cladding The Interior Of A Vehicle Roof Has Control Element And Interior Light Integrated Into Sliding Roof Motor Cover Mounted On Roof Canopy Enclosed By Cladding", Jun. 11, 2014, German Patent Office, DE19857461A1 (Year: 2014).*

(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

A roof assembly for a vehicle having an opening comprises a frame having two parallel longitudinal beams connected to a transverse beam. A drive system for a panel supports and moves the panel and includes a motor attached to the transverse beam, two substantially parallel guide rails attached to the longitudinal beams, and a support mechanism movably guided in the guide rails and operatively connected to the motor. The frame and the drive system as a unit are adapted to each other such that the drive system is partly inserted into the frame between the longitudinal beams and rotated such that the motor is on the lower side of the transverse beam of the frame and the guide rails at least partly positioned on a portion of the upper side of the longitudinal beams of the frame. There is also disclosed a method of assembling the roof assembly.

15 Claims, 19 Drawing Sheets

(52) U.S. Cl.
CPC ... *E05Y 2201/434* (2013.01); *E05Y 2201/654* (2013.01); *E05Y 2201/684* (2013.01); *E05Y 2600/45* (2013.01); *E05Y 2900/542* (2013.01)

(58) Field of Classification Search
CPC ... E05Y 2900/542; B62D 65/06; B60J 7/0573
USPC ............ 296/216.01, 216.02, 216.03, 216.04, 296/216.05, 216.07, 216.08, 216.09
See application file for complete search history.

(56) References Cited

U.S. PATENT DOCUMENTS

| | | | |
|---|---|---|---|
| 4,417,763 A | 11/1983 | Schlapp et al. | |
| 4,468,063 A | 8/1984 | Yukimoto et al. | |
| 4,619,480 A | 10/1986 | Motoyama et al. | |
| 4,630,859 A | 12/1986 | Bienert et al. | |
| 4,647,104 A | 3/1987 | Kohlpaintner et al. | |
| 4,647,106 A | 3/1987 | Furst | |
| 4,671,565 A | 6/1987 | Grimm et al. | |
| 4,684,169 A | 8/1987 | Igel et al. | |
| 4,725,092 A | 2/1988 | Reintges et al. | |
| 4,749,227 A | 6/1988 | Bienert et al. | |
| 4,752,099 A | 6/1988 | Roos et al. | |
| 4,877,285 A | 10/1989 | Huyer | |
| 4,893,869 A | 1/1990 | Fuerst | |
| 4,995,667 A | 2/1991 | Tamura et al. | |
| 5,020,849 A | 6/1991 | Schlapp et al. | |
| 5,020,850 A | 6/1991 | Bienert et al. | |
| 5,058,947 A | 10/1991 | Huyer | |
| 5,066,068 A | 11/1991 | Suzuki et al. | |
| 5,104,178 A | 4/1992 | Bienert | |
| 5,154,482 A | 10/1992 | Hayashi et al. | |
| 5,238,290 A | 8/1993 | Farmont | |
| 5,259,662 A | 11/1993 | Huyer | |
| 5,288,125 A | 2/1994 | Huyer | |
| 5,527,085 A | 6/1996 | Ochiai et al. | |
| 5,593,204 A | 1/1997 | Wahl et al. | |
| 5,618,081 A | 4/1997 | Nabuurs | |
| 5,765,907 A | 6/1998 | Nabuurs | |
| 5,845,959 A | 12/1998 | Ueki | |
| 6,164,718 A | 12/2000 | Stallfort | |
| 6,257,658 B1 | 7/2001 | Nabuurs et al. | |
| 6,325,453 B1 | 12/2001 | Manders | |
| 6,343,833 B1 | 2/2002 | Manders | |
| 6,390,544 B1 | 5/2002 | Manders et al. | |
| 6,419,310 B1 | 7/2002 | Manders | |
| 6,471,286 B1 | 10/2002 | Manders et al. | |
| 6,957,851 B2 | 10/2005 | Manders et al. | |
| 8,322,783 B2 | 12/2012 | Manders | |
| 8,348,240 B2 | 1/2013 | Butsuen et al. | |
| 9,415,666 B2 * | 8/2016 | Bojanowski | B21D 53/88 |
| 9,969,246 B2 | 5/2018 | Nellen et al. | |
| 10,322,623 B2 | 6/2019 | Land et al. | |
| 2004/0007902 A1 | 1/2004 | Manders et al. | |
| 2004/0222675 A1 | 11/2004 | Oberheide | |
| 2007/0228779 A1 | 10/2007 | Stallfort | |
| 2010/0320808 A1 | 12/2010 | Marx et al. | |
| 2012/0049584 A1 * | 3/2012 | Manders | B60J 7/0573 296/223 |
| 2016/0137243 A1 * | 5/2016 | Dayoub | B60J 7/04 296/216.04 |
| 2016/0288631 A1 | 10/2016 | Parkila et al. | |
| 2016/0297286 A1 * | 10/2016 | Nellen | F16C 1/101 |
| 2018/0147921 A1 | 5/2018 | Land et al. | |

FOREIGN PATENT DOCUMENTS

| | | | |
|---|---|---|---|
| DE | 3603314 A1 | 8/1987 | |
| DE | 3920372 C1 | 8/1990 | |
| DE | 3930756 A1 | 3/1991 | |
| DE | 4101288 A1 | 7/1991 | |
| DE | 4014487 C1 | 8/1991 | |
| DE | 4012635 A1 | 10/1991 | |
| DE | 9116421 U1 | 11/1992 | |
| DE | 9116412 U1 | 12/1992 | |
| DE | 4405742 C1 | 5/1995 | |
| DE | 19514585 A1 | 10/1996 | |
| DE | 19857461 A1 * | 6/2000 | ............ B60Q 3/51 |
| EP | 0033816 A1 | 8/1981 | |
| EP | 0143589 A2 | 6/1985 | |
| EP | 0218890 A1 | 4/1987 | |
| EP | 0292730 A2 | 11/1988 | |
| EP | 0296644 A2 | 12/1988 | |
| EP | 0343750 A1 | 11/1989 | |
| EP | 0373692 A2 | 6/1990 | |
| EP | 0437283 A1 | 7/1991 | |
| EP | 0517318 A1 | 12/1992 | |
| EP | 0543427 A1 | 5/1993 | |
| EP | 0638452 A1 | 2/1995 | |
| EP | 0747249 A1 | 12/1996 | |
| EP | 0899140 A1 | 3/1999 | |
| EP | 1095807 A1 | 5/2001 | |
| EP | 3326851 A1 | 5/2018 | |
| FR | 2495068 A1 | 6/1982 | |
| FR | 2527995 A1 | 12/1983 | |
| GB | 2078295 A | 1/1982 | |
| JP | S61278422 A | 12/1986 | |
| JP | H04297323 A | 10/1992 | |
| JP | H11240333 A | 9/1999 | |
| JP | 5185693 B2 | 4/2013 | |
| WO | 0006403 A2 | 2/2000 | |
| WO | 2010088951 A1 | 8/2010 | |

OTHER PUBLICATIONS

European Search Report in corresponding European Patent Application No. 19196379.2, dated Apr. 7, 2020.

* cited by examiner

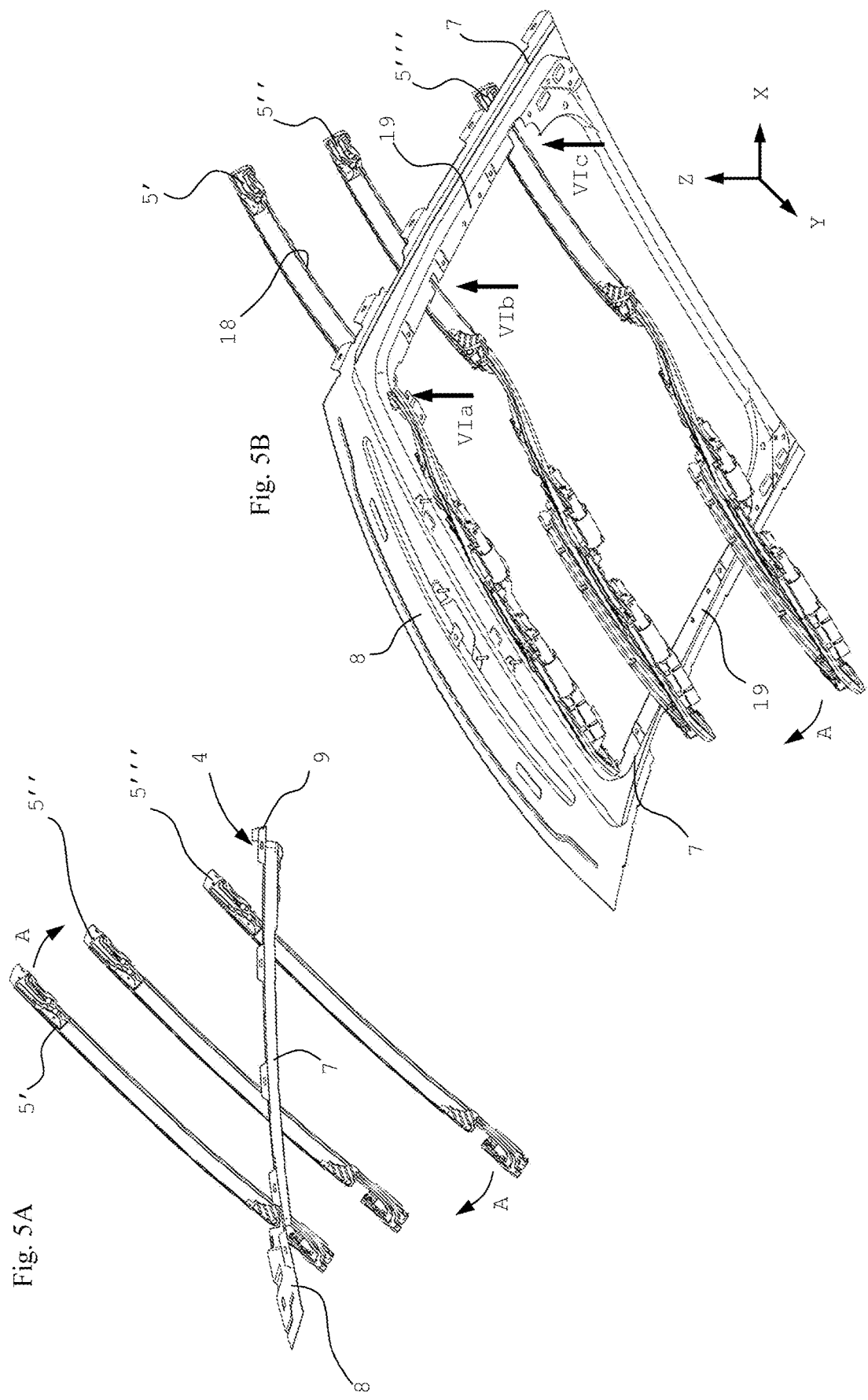

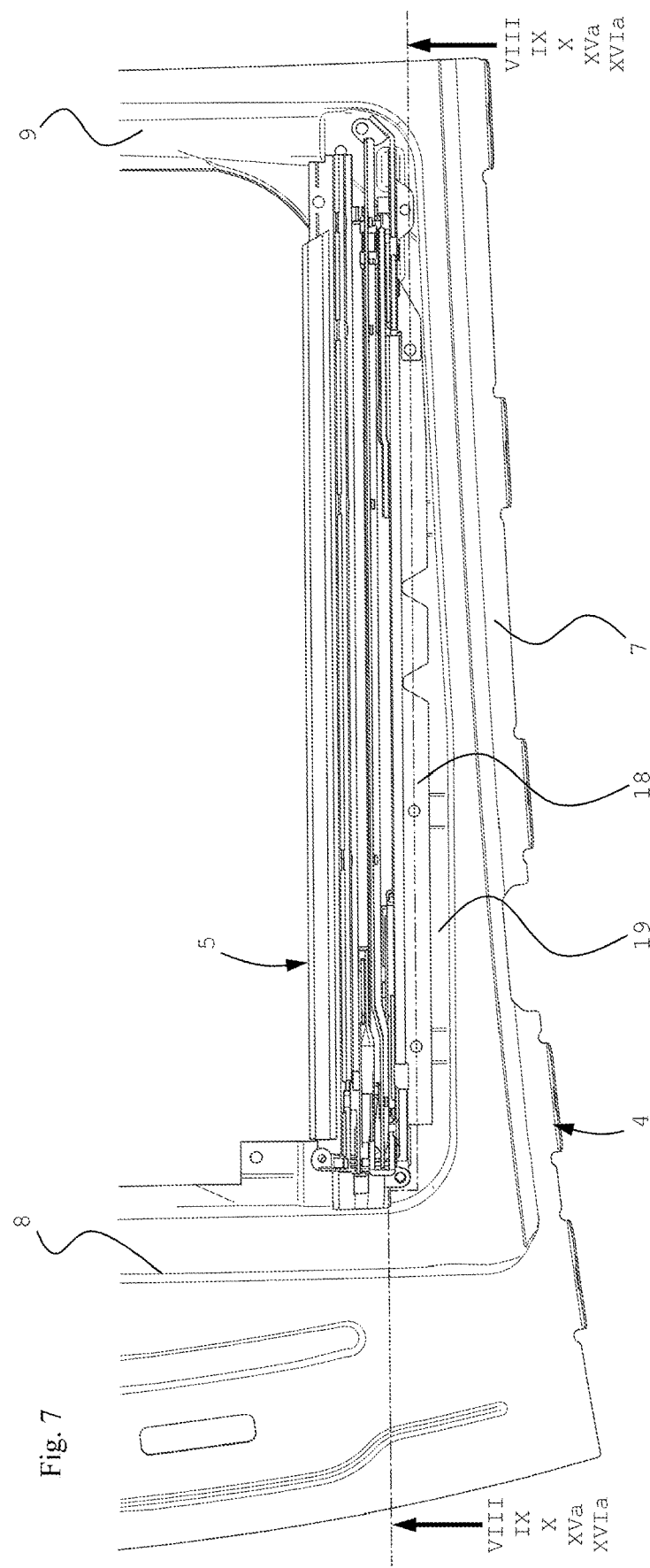

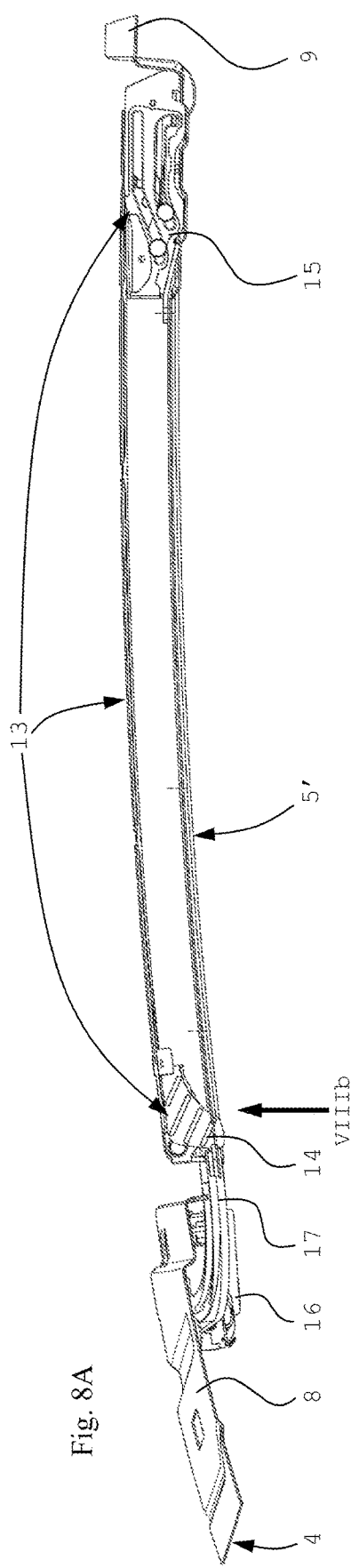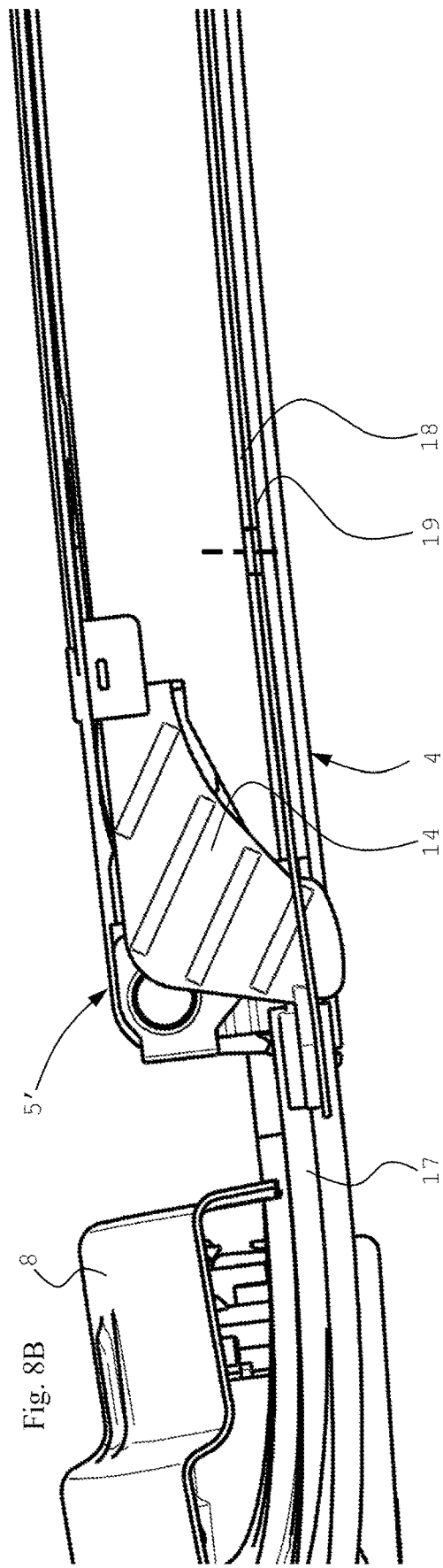

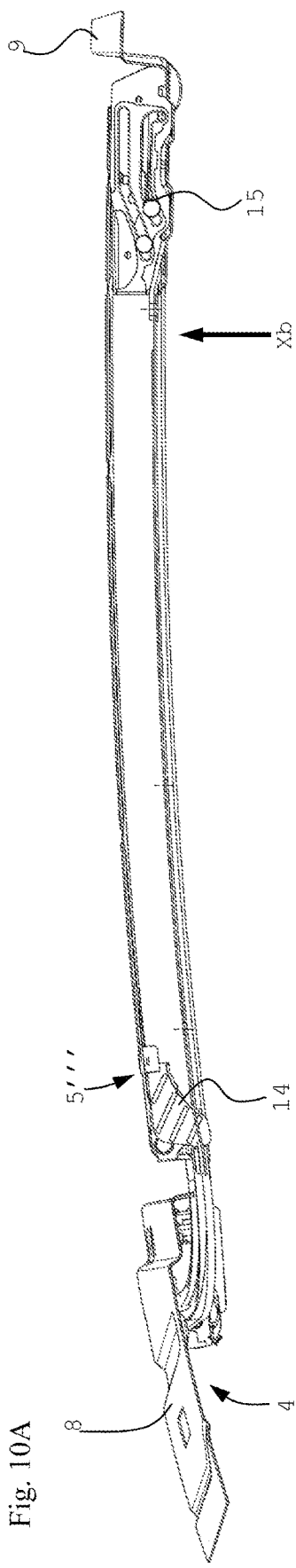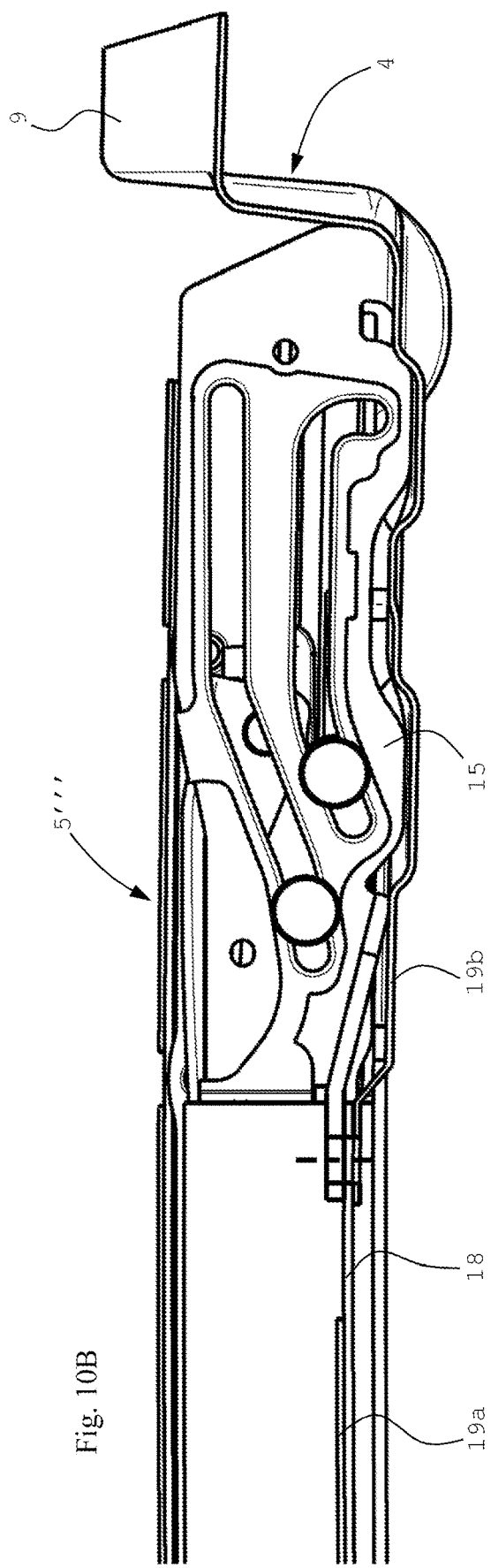

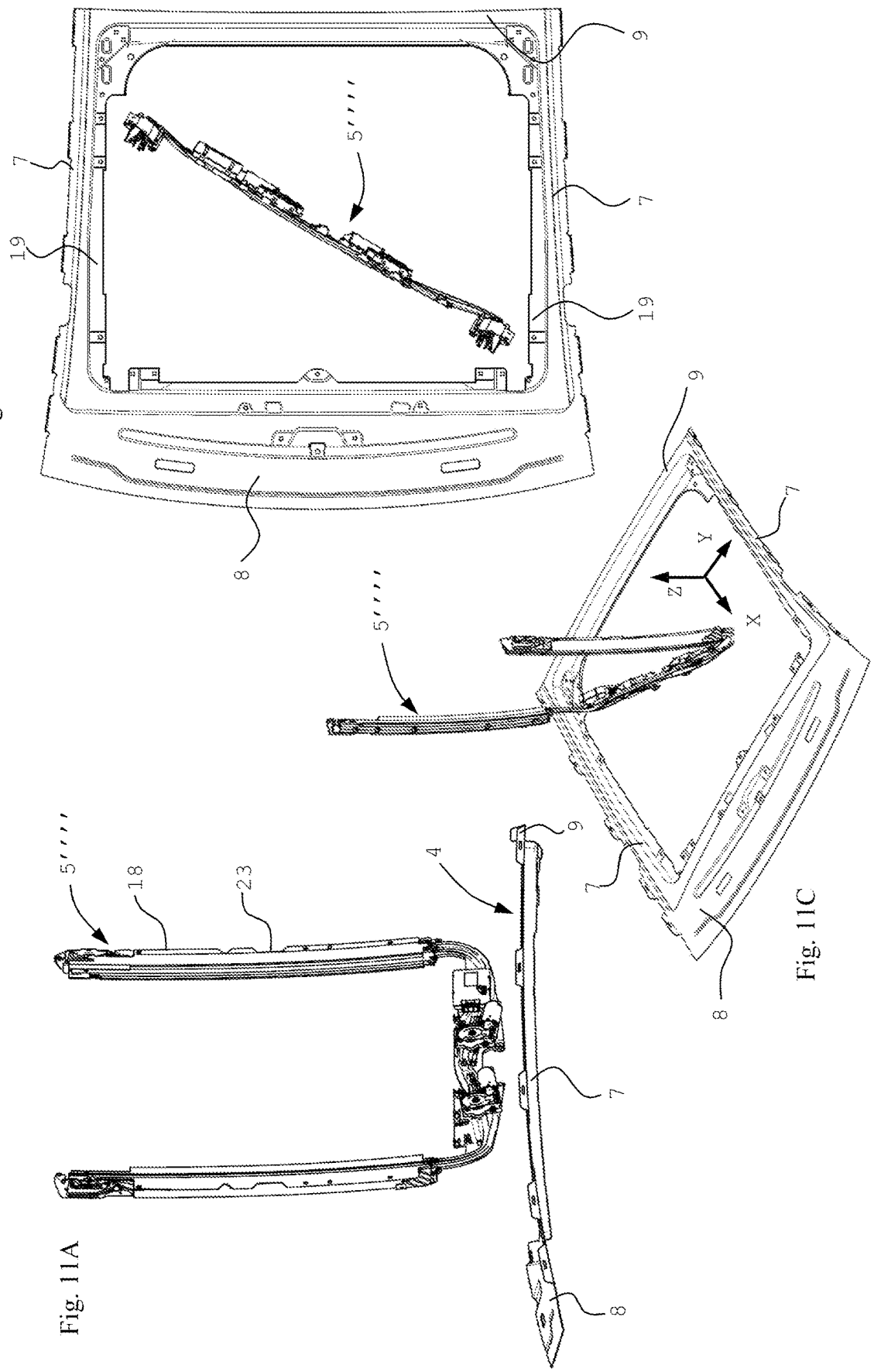

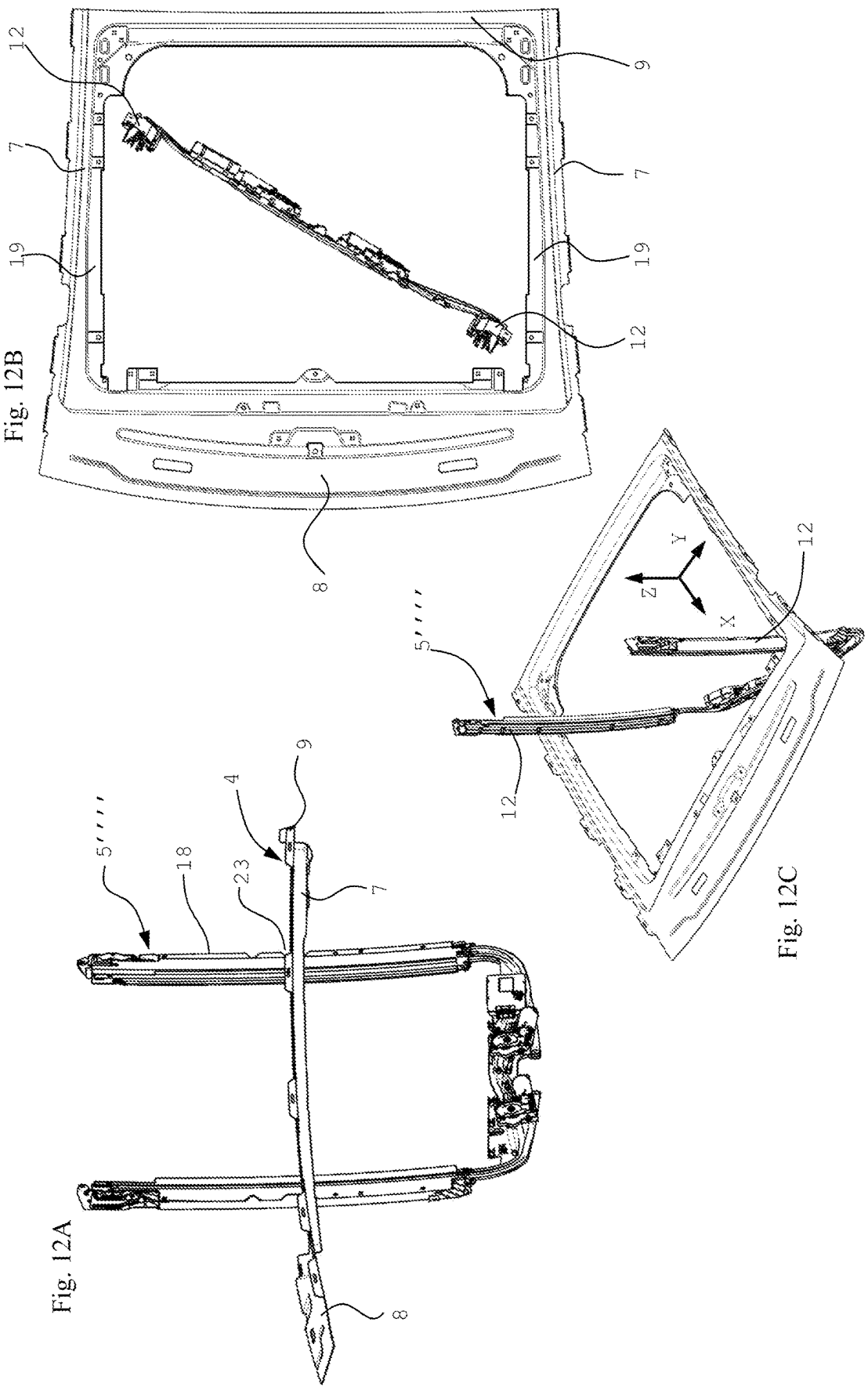

ROOF ASSEMBLY FOR A VEHICLE AND A METHOD OF ASSEMBLING

BACKGROUND

The invention firstly relates to a roof assembly for a vehicle having an opening in its roof part, comprising a frame having at least a transverse beam and two substantially parallel longitudinal beams connected to the opposite ends of the transverse beam, at least one closure for closing and at least partially opening said opening, and a drive system for the closure, supporting and moving the closure and including a drive motor attached to the transverse beam, two substantially parallel guide rails attached to the longitudinal beams, and a support mechanism movably guided in the guide rails and operatively connected to the drive motor by elongated connecting members), said drive system forming a preassembled unit attached to the frame.

In a roof assembly the pre-mounted drive system is positioned on and fastened to the upper side of the frame. The transverse beam includes an opening and the drive motor is attached to the lower side of a motor plate such that the drive motor is always reachable from below for maintenance and replacement purposes.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One aspect comprises a roof assembly wherein the frame and the drive system are adapted to each other such that the drive system can be partly inserted into the frame between the longitudinal beams and rotated such that the drive motor is positioned on the lower side of the transverse beam of the frame and the guide rails at least partly positioned on a portion of the upper side of the longitudinal beams of the frame.

By arranging only the guide rails at least partly on top of a portion of the longitudinal beams of the frame and the drive motor below the transverse beam, the drive motor is not only reachable from below, but is also automatically positioned in a dry portion of the roof assembly, i.e. in a position hidden from drip water. When the drive motor is on top of the transverse beam, as in the prior art, additional measures must be taken for the water management system to protect the drive motor against drip water. One possibility is to arrange a drain channel above the drive motor or to integrate a drain channel in a front header to be mounted on the front part of the frame. This can be avoided. It is also not necessary to provide an opening in the transverse beam of the frame to make the motor reachable.

The drive system is preferably mounted to the frame by mounting members inserted from the upper side of the frame, for example screws inserted and tightened from the upper side of the frame.

This is especially favorable if all mounting operations are done on and from the upper side of the frame, thereby avoiding the frame to be turned over If the width of the drive system beyond the guide rails at the position of the drive motor is smaller than the width of the drive system at the guide rails, it is easy to insert the drive system between the longitudinal beams and to rotate it so that it is positioned below the transverse beam.

If the transverse beam has a downwardly suspended edge at the side of the transverse beam adjacent the longitudinal beams, this edge may be interrupted to allow passage of at least a part of the elongated connecting members, preferably drive cables or their cable guides.

Thus, no threading of cables through upward walls at the transition between longitudinal beams and transverse beam is necessary as is required in some prior art roof assemblies.

In one embodiment, flanges of the longitudinal beams each have a recess on their edges facing each other to allow perpendicular passage of the drive system, and wherein the guide rails are on the upper side of the longitudinal beams on the side of the recesses remote from the transverse beam under which the drive motor is positioned.

This is a way of allowing also wider drive systems to enter the space between the beams and allow it to rotate to a position below the transverse beam.

In another embodiment, flanges of the guide rails have recesses in their edges facing away from each other such that the smallest distance between the recesses of the two guide rails is smaller than the smallest distance between the facing edges of the two longitudinal beams of the frame.

This allows also wider drive systems to enter the space between the frame beam albeit in a position rotated around a Z-axis of the frame. The drive system should be inserted into the space between the beam to such depth that the recesses in the flanges of the guide rails are in line with the adjacent portion of the longitudinal beams. If the drive system is then rotated around the Z-axis, the adjacent portions of the longitudinal beams will then enter the recesses. The adjacent portions of the longitudinal beams and/or the guide rails, in particular horizontal flanges, should have a step to enable a subsequent rotation around the Y-axis.

Another aspect also includes a method of assembling a roof assembly for a vehicle having an opening in its roof part, said roof assembly comprising a frame having at least a transverse beam and two substantially parallel longitudinal beams connected to the opposite ends of the transverse beam, at least one closure which is movable between an closed position closing the opening and an open position, and a drive system for the closure supporting and moving the closure, including a drive motor, two substantially parallel guide rails, a support mechanism to be movably guided in the guide rails and operatively connected to the drive motor by elongated connecting members, said method including the steps of assembling the parts of the drive system into a preassembled unit, mounting the preassembled drive system to the transverse and longitudinal beams of the frame, such that the motor is attached to the transverse beam and the guide rails are attached to the longitudinal beams of the frame.

In this method the drive system is attached to the frame by:
moving the drive system to the frame under an angle,
moving the drive system partially into the space between the longitudinal and transverse beams, rotating the drive system at least around a transverse axis of rotation such that the drive motor is positioned below the transverse beam and the guide rails are positioned at least partially above a portion of the longitudinal beams.

The drive system may be moved into the space between the longitudinal and transverse beams from the upper side of the frame and with the drive motor first, for example by moving the drive system into the space between the longitudinal and transverse beams at a position near the transverse beam.

Alternatively, the drive system may be moved into the space between the longitudinal and transverse beams from the lower side of the frame and with the ends of the guide rails remote from the drive motor first, for example by moving the drive system into the space between the longitudinal and transverse beams at a position spaced from the transverse beam.

The drive system may be attached to the frame by mounting members manipulated from the upper side of the frame.

The support mechanism for the panel may be positioned in a position in which the panel would be situated outside the roof opening, and preferably the panel is attached to the support mechanism either before mounting the drive system or immediately after mounting the drive system.

In a favorable embodiment the drive system is moved into the space between the longitudinal and transverse beams with the support mechanism in a position in which the panel would be in the open position.

This has the advantage that the panel can be mounted to the support mechanism without actuation of the drive system because in general the panel is mounted to the support mechanism when it is in its open position. Of course, the space between the longitudinal beams should be sufficient to receive the drive system with the support mechanism in its open position.

This is even more important in the embodiment in which the panel is mounted to the support mechanism of the drive system before it is moved into the space between the longitudinal and transverse beams.

The space must then be sufficient to not only receive the drive system, but also the panel.

BRIEF DESCRIPTION OF THE DRAWINGS

Further details and advantages follow from the below description with reference to the drawings showing embodiments by way of example.

FIGS. 5a and 5b are views similar to that of FIGS. 4a and 4b, but showing the 3 drive systems in a further position of introduction.

FIG. 7 is a plan view of a part of the frame with assembled drive system.

FIG. 8a is a sectional view according to section line VIII-VIII in FIG. 7 showing the frame and drive system that enable the first way of assembly.

FIG. 8b is an enlarged detail of FIG. 8a according to arrow VIIIb in FIG. 8a.

FIGS. 10a and 10b are views similar to that of FIGS. 8a and 8b, but showing the frame and driving system that enable the third way of assembly.

FIGS. 11a, 11b and 11c are a side view, plan view and perspective view of a frame and drive system that enable a fourth way of assembly, in a first assembly step.

FIGS. 12a, 12b and 12c are views similar to that of FIGS. 11a, 11b and 11c, but showing a second assembly step.

DETAILED DESCRIPTION OF ILLUSTRATIVE EMBODIMENTS

Figure 1:
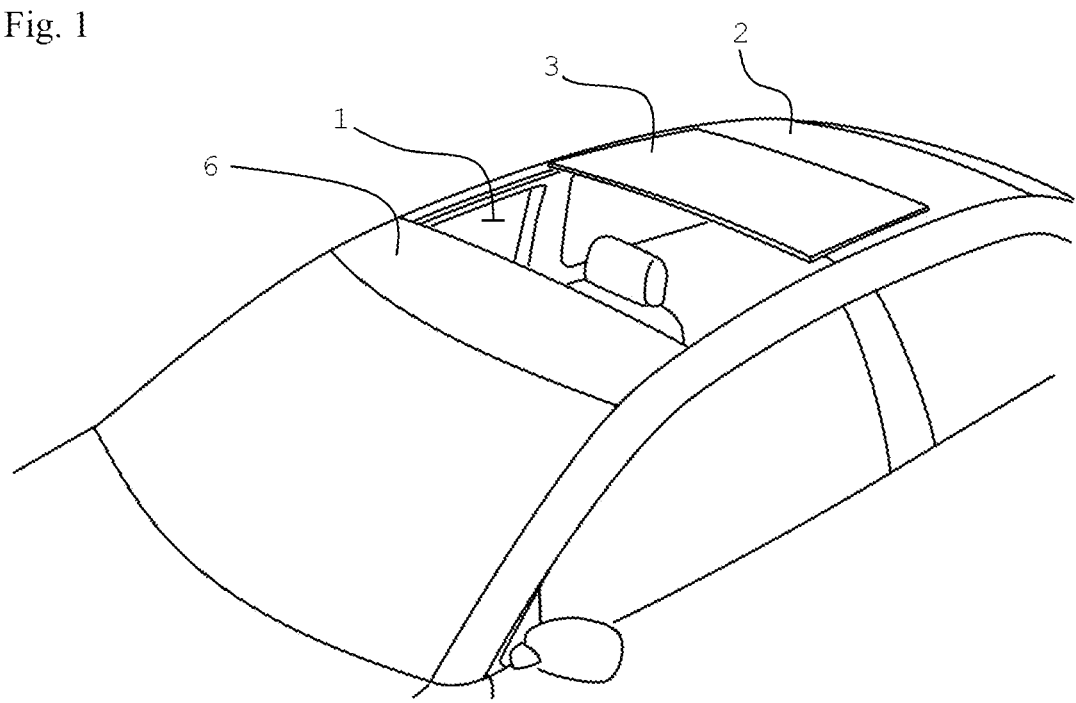
FIG. 1 is a perspective view of a vehicle roof having a roof system mounted therein.

FIG. 1 shows part of a vehicle, in particular the roof of an automobile, which comprises at least a roof opening 1 defined in a (stationary) roof part 2. A closure, here in the form of a closure panel 3, is movable between a closed position (not shown) in which it closes the roof opening 1, and an open position (FIG. 1) in which it opens the roof opening 1 and in which it is positioned at least partially above the roof part 2, here the fixed roof part adjoining the rear edge of the roof opening 1.

As is known per se such an roof system (which is also known as a spoiler roof or exterior sliding roof) could comprise additional elements, such as for example a tiltable wind deflector positioned ahead of the roof opening 1, or further movable or stationary panels, for example in a position behind the panel 3 when it is in its closed position.

Figure 2A:
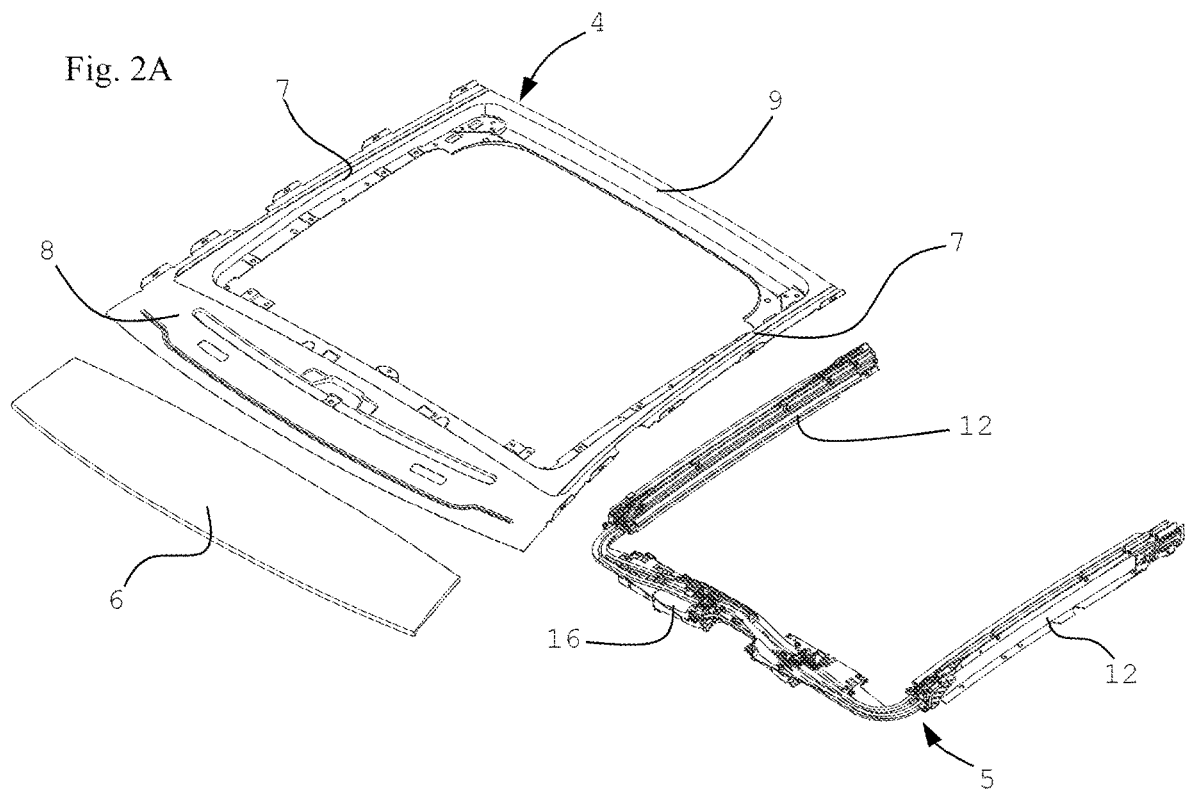
FIGS. 2a and 2b are a perspective plan view of a frame and drive system of a roof system in an exploded and mounted condition.
Figure 2B:
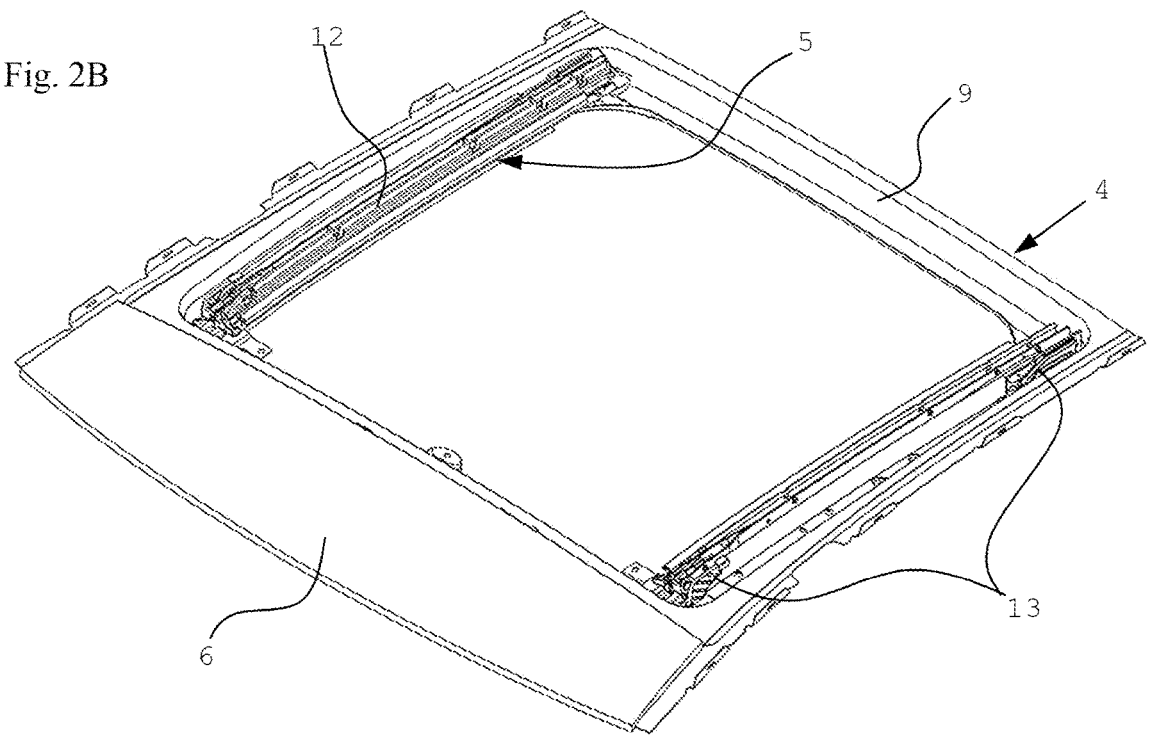
Figure 3A:
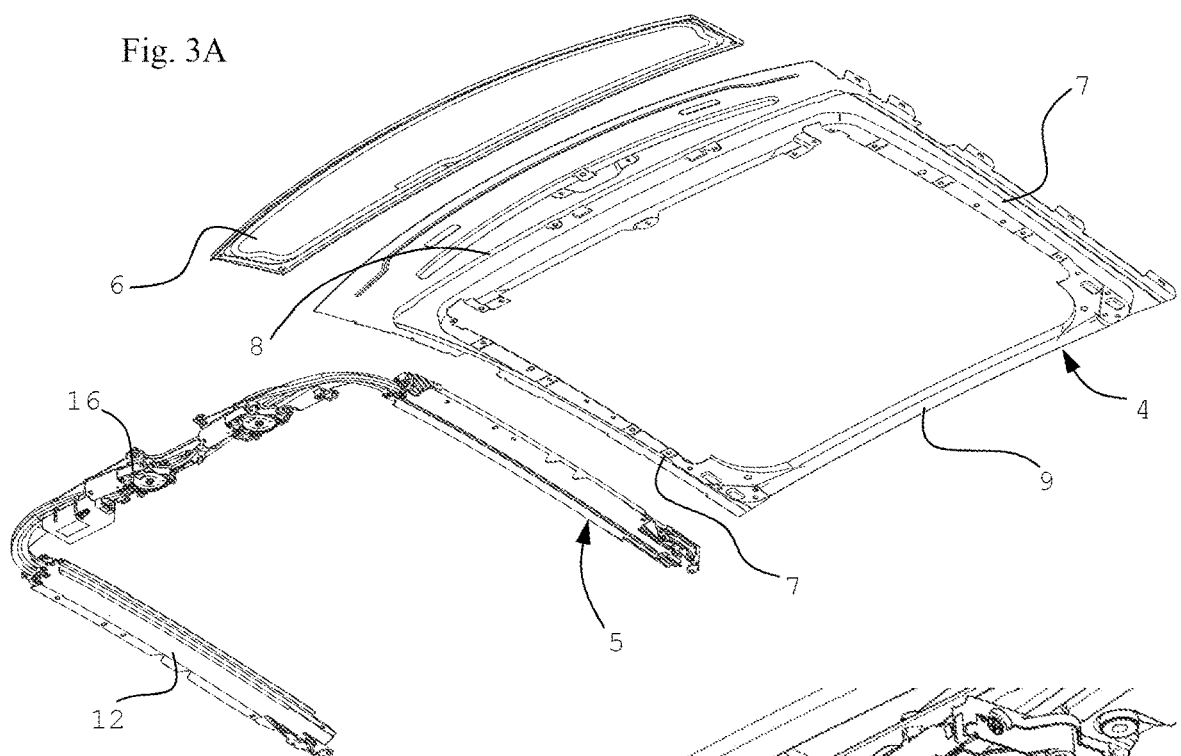
FIGS. 3a and 3b are a perspective bottom view of a frame and drive system of a roof system in an exploded and mounted condition.
Figure 3C:
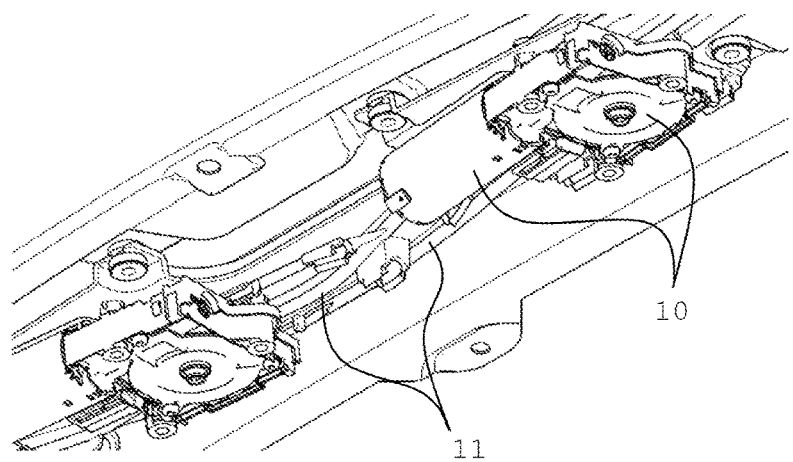
FIG. 3c shows detail IIIc in FIG. 3b on a larger scale.
Figure 3B:
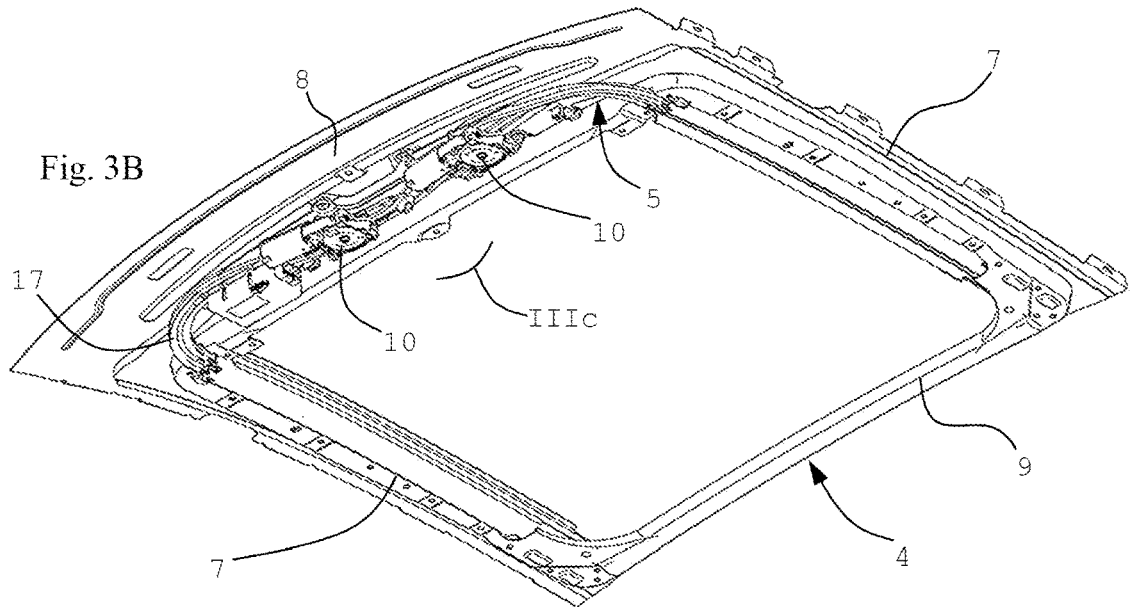

FIGS. 2 and 3 show the main parts of the roof assembly, including a frame 4, a drive system 5 for panel 3 and a header 6 covering the front side of frame 4 and, after mounting the roof assembly, forming part of the roof skin.

Frame 4 includes two parallel side beams or longitudinal beams 7 and two transverse beams, i.e. a front beam 8 and a rear beam 9 connecting longitudinal beams 7 at their front and rear ends. The frame 4 may be formed in one piece or from several parts mounted together and made e.g. from metal or plastic material.

Drive system 5 for panel 3 comprises at least one or more drive motors 10 (here two drive motors 10), elongated transmission members, such as push-and-pull cables 11, two parallel guide rails 12 to be mounted to longitudinal beams 7 and an operating or support mechanism 13 for closure panel 3 in order to move it between the closed and open positions. For this purpose, parts of support mechanism 13 are slidable in each guide rail 12. The panel 3 comprises for example a glass or plastic transparent or metal non-transparent sheet supported on the longitudinal sides by a panel bracket fixed to the sheet of panel 3, for example by encapsulation material and/or any other means. The guide rails 12 are straight or slightly curved in order to follow the curvature of the vehicle roof. Such guide rails and support mechanism are shown for example in U.S. Pat. No. 9,969,246, the contents of which are incorporated herein by reference thereto. The support mechanism 13 includes a front support 14 supporting and moving the front side of panel 3 and a rear support 15 supporting and moving the rear side of panel 3 at the position of each guide rail 12. When guide rail 12 is used in the context of the present application, it also includes flanges or parts attached to it or supporting it and forming part of drive system 5.

Drive system 5 can be preassembled into a U-shaped preassembly including drive motors 10 mounted on a front member 16, cables 11 and guide rails 12. Cables 11 may be guided in cable guides 17 which may also be used to connect guide rails 12 to front member 16 so as to form the U-shaped drive system.

As is shown in FIGS. 2 and 3, drive system 5 is mounted such to frame 4 that front member 16 with motors 10 and cables 11/cable guides 17 are positioned below front beam 8 of frame 4, while guide rails 12 are positioned at least partly above longitudinal beams 7. Of course guide grooves of guide rails 12 will always be uncovered by the frame 4, at least where the front and rear support 14, 15 of the support mechanism 13 move in those guide grooves of guide rails 12.

Figure 4B:
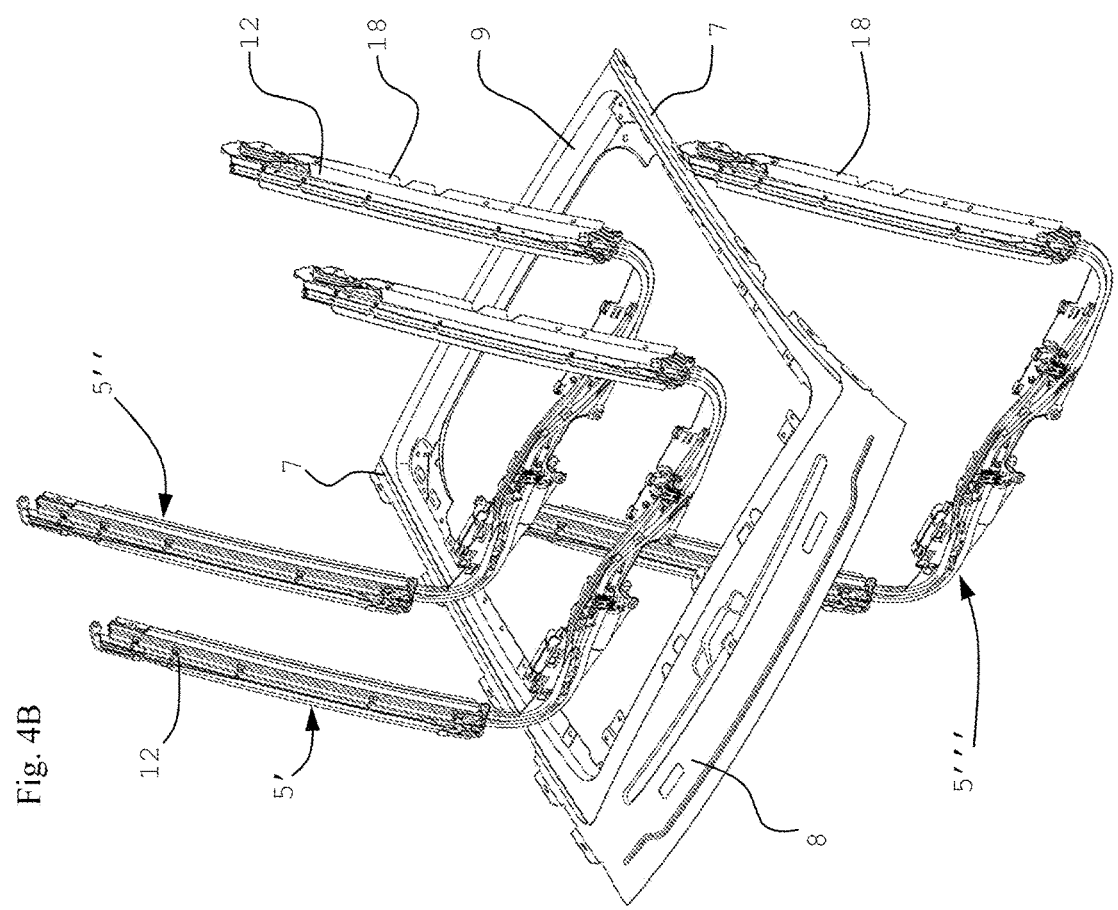
FIGS. 4a and 4b show in a side view and a perspective plan view a frame and 3 drive systems to illustrate 3 ways of assembling the frame and drive system.
Figure 4A:
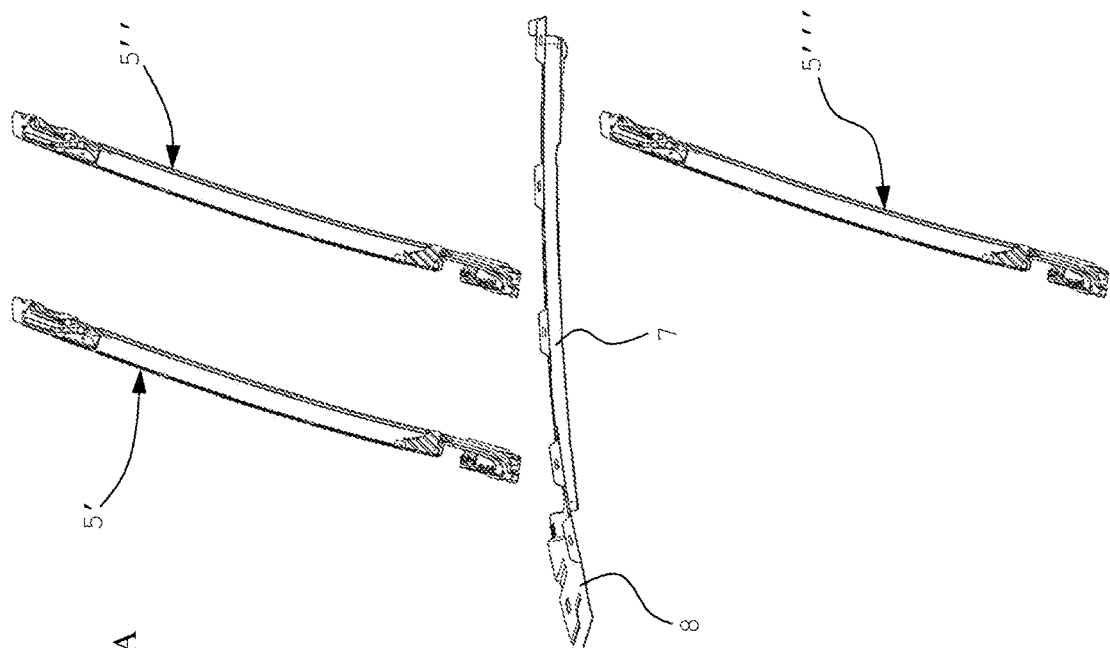

FIGS. 4 and 5 show 3 ways of mounting drive system 5 to frame 4. The ways differ in these embodiments predominantly by the position where and how drive system 5 is inserted into the space between longitudinal beams 7 and transverse beams 8, 9.

Figure 6A:
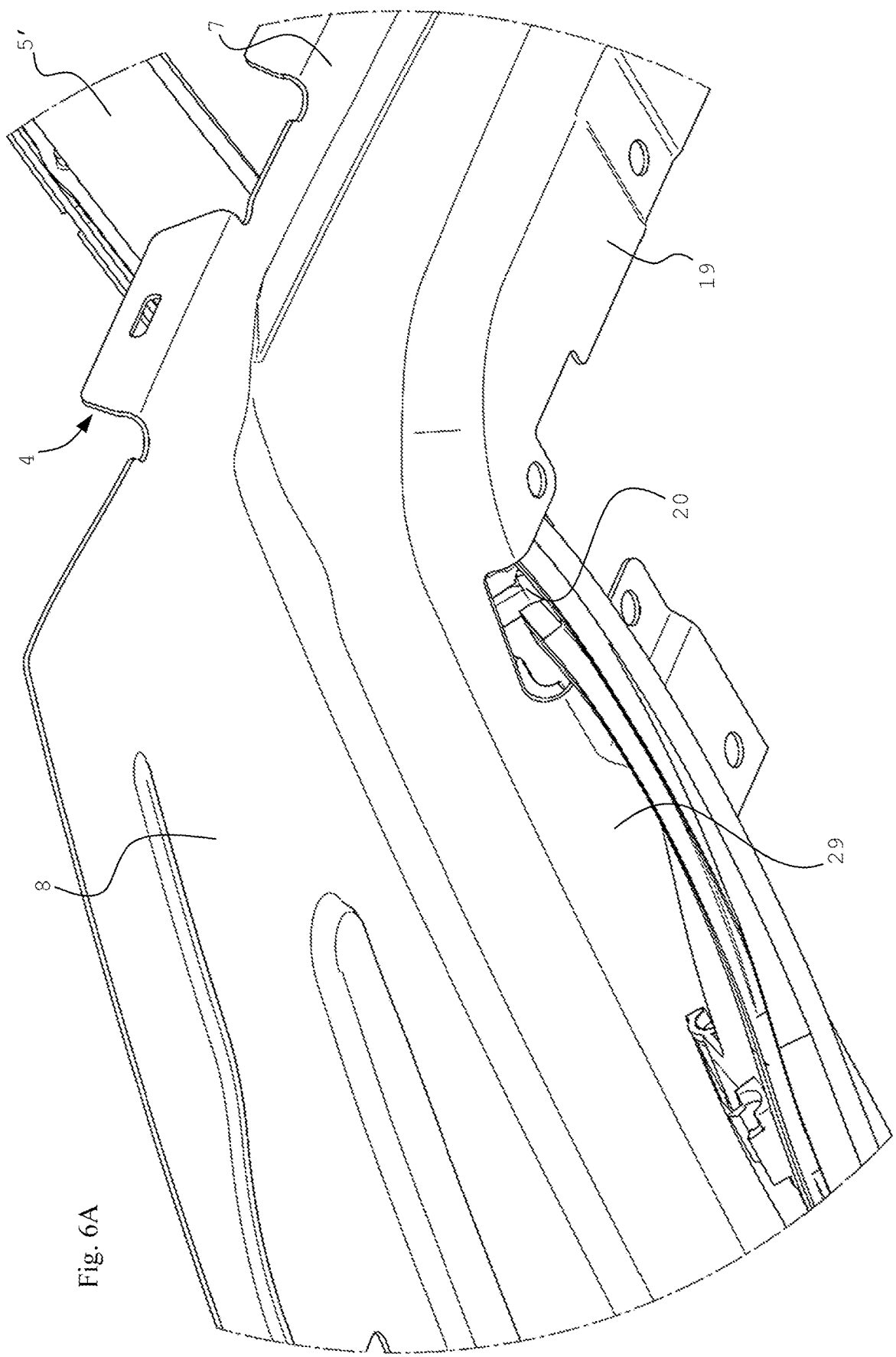
FIGS. 6a, 6b and 6c are enlarged perspective views according to arrows VIa, VIb and VIc in FIG. 5b showing adaptions of the frame to enable 3 ways of assembly of the drive system.

Drive system 5' is inserted into this space close to front beam 8 and with motors 10 first, so that a horizontal flange 18 of the guide rails 12 will come to rest on top of a horizontal flange 19 of frame 4. Front member 16 with motors 10 and most part of cable guides 17 will be below front beam 8. A recess or interruption 20 (FIG. 6a) in a downwardly suspended flange or edge 29 of front member 16 is provided to facilitate insertion of drive system 4 during assembly and to allow passage of guide channels 17 for drive cables 11 from a position above flange 19 longitudinal beam 7 of frame 4 to a position below front beam 8 after assembly. No threading of cables 11 through parts of frame 4 is necessary then. As drive system 4 at the position of cable guides 17 beyond guide rails 12 has a width which is smaller than at the position of guide rails 12, it is not necessary to make recesses or adaptations flanges 19 of frame 4 to allow insertion of drive system 5.

Figure 6B:
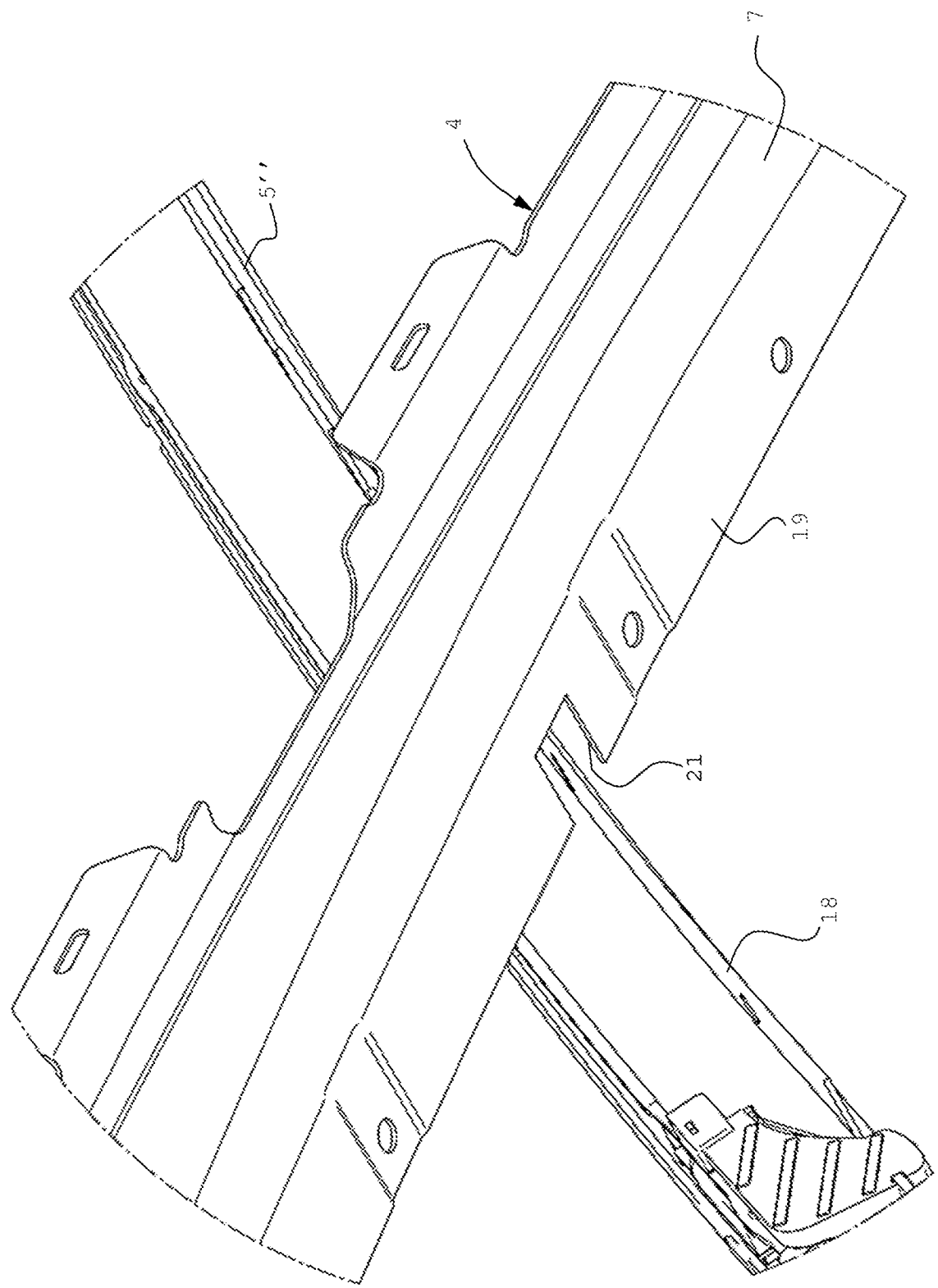

Drive system 5" should be inserted into the space substantially halfway between front and rear beams 8, 9. A recess 21 (FIG. 6b) is provided in horizontal flanges 19 of frame 4. Recess 21 is so deep that the width of drive system 5 at the position of guide rails 12 is slightly smaller than the distance between the bottoms of recesses 21 in opposite flanges 19 to allow insertion of drive system 5. Horizontal flange 18 of guide rails 12 will be positioned on top of horizontal flange 19 of frame 4 towards rear beam 9 and will be positioned below horizontal flange 19 of frame 4 towards front beam 8.

Figure 6C:
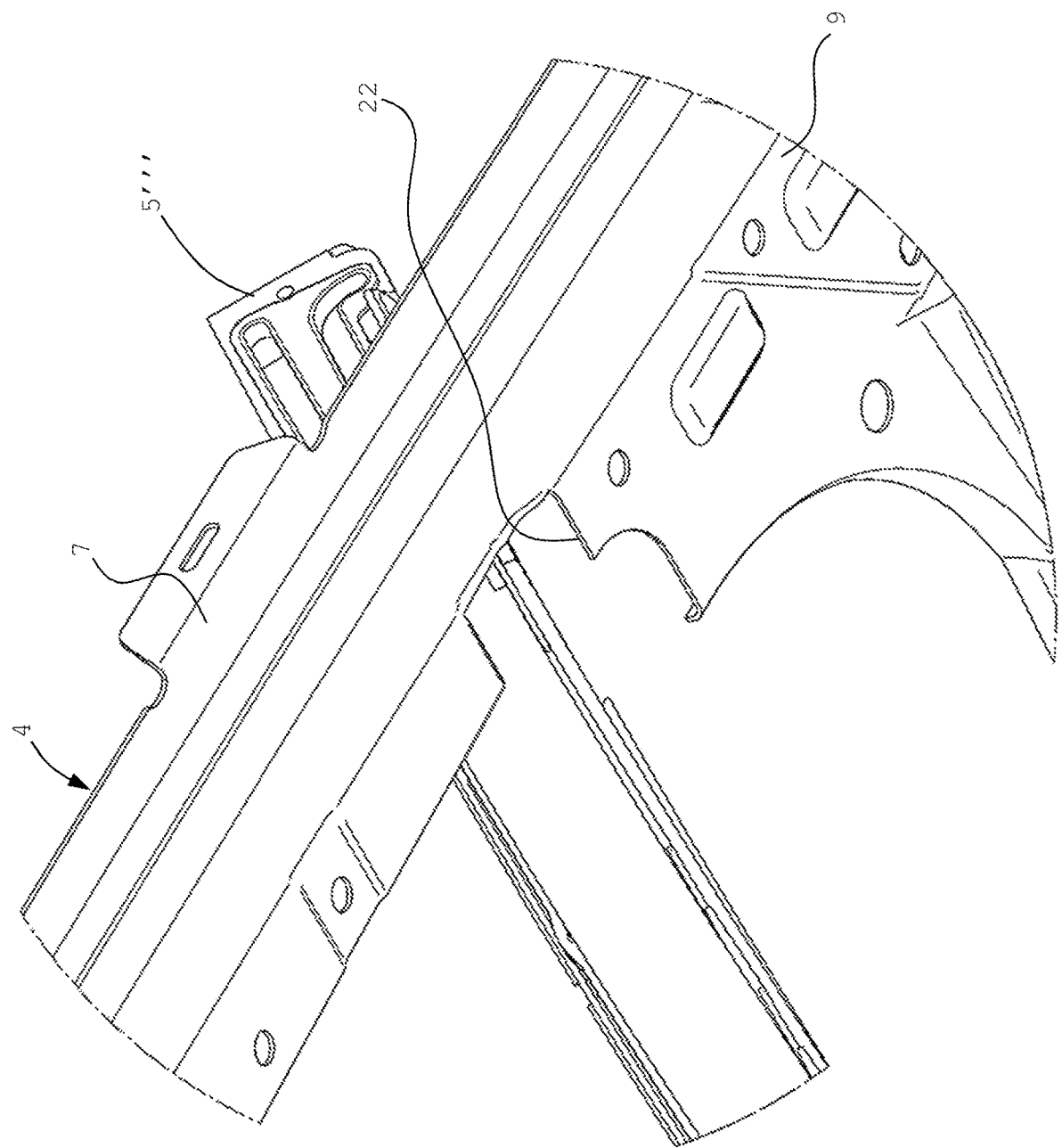

Drive system 5''' is inserted into the space between beams 7, 8, 9 from below (so with the ends of guide rails 12 away from motors 10 first) to minimize insertion depth. Only a minor portion of horizontal flange 18 of guide rails 12 will be above horizontal flanges 19 of frame 4, the major portion of it will be below. A recess 22 (FIG. 6c) determines the insertion position.

From the inserted position as shown in FIGS. 5a and 5b, drive systems 5', 5" and 5''' are rotated according to arrow A to unite drive system 5 and frame 4 such that flanges 18 and 19 are positioned one on top of the other.

Figure 9A:
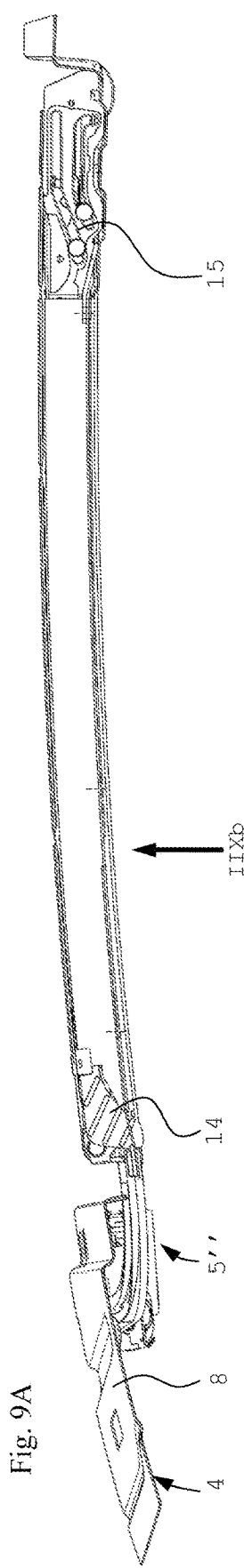
FIGS. 9a and 9b are views similar to that of FIGS. 8a and 8b, but showing the frame and drive system that enable the second way of assembly.
Figure 9B:
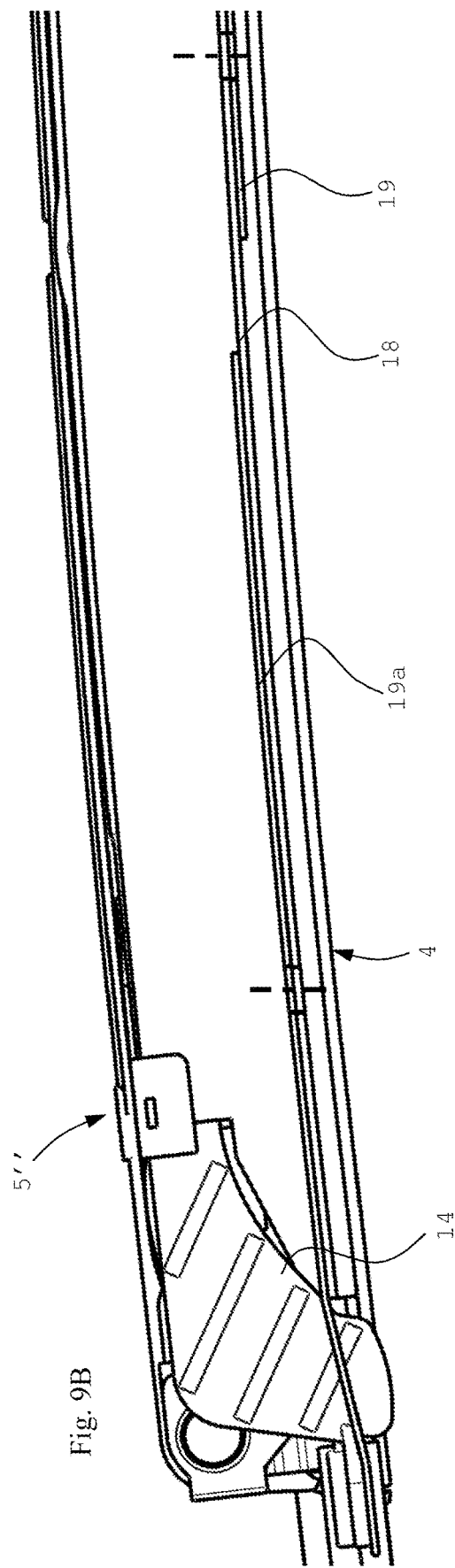

The height of the flanges 18 and/or 19 is such that one portion of flange 18 can be below and another portion of it can be above flange 19. FIG. 7 shows drive system 5 and frame 4 in assembled condition. FIGS. 8a and 8b show the embodiment including drive system 5' in which horizontal flange 18 of guide rails 12 is completely above flange 19 of frame 4. FIGS. 9a and 9b show the variation having drive system 5" and it is clearly shown that flange 19 of frame 4 has a higher front portion 19a and a lower rear portion 19b to allow flange 18 to lie below and above it. FIGS. 10a and 10b show something similar with drive system 5''' with a longer portion 19a and a shorter portion 19b.

Figure 13B:
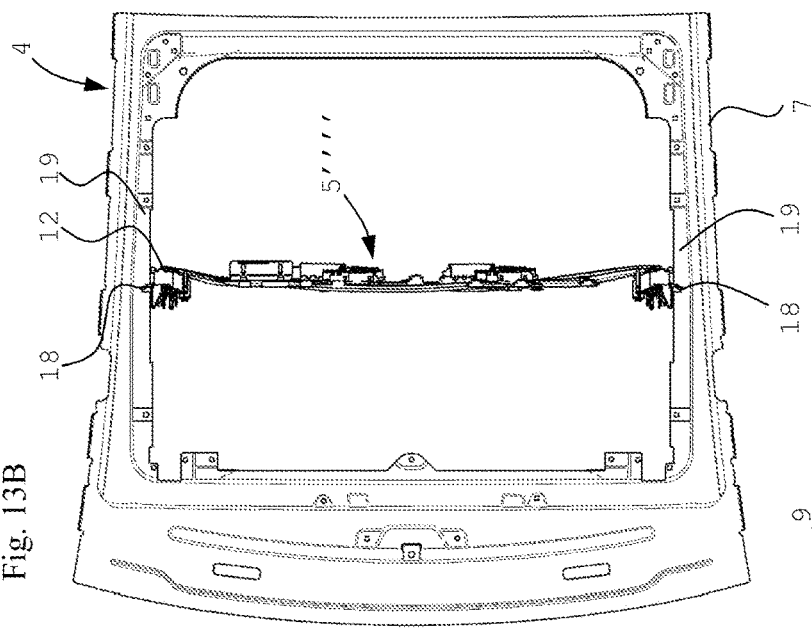
FIGS. 13a, 13b and 13c are views similar to that of FIGS. 11a, 11b and 11c, but showing a third assembly step.
Figure 13A:
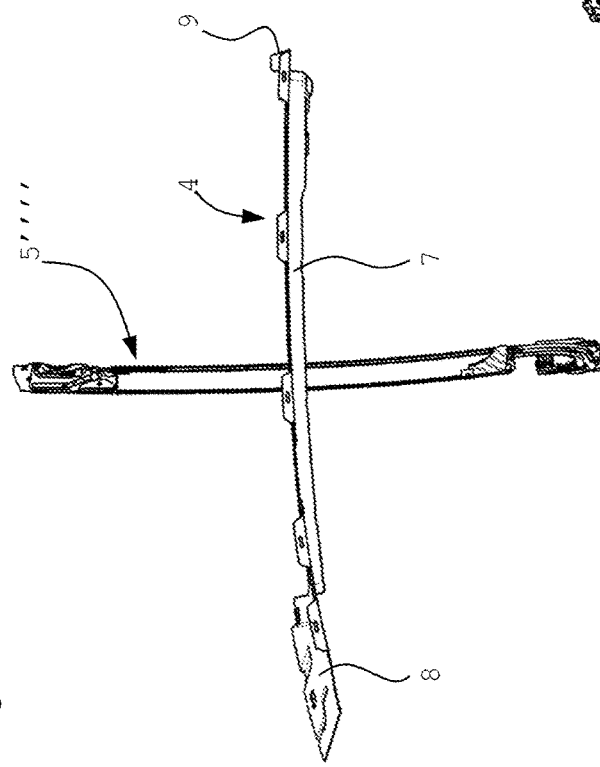
Figure 13C:
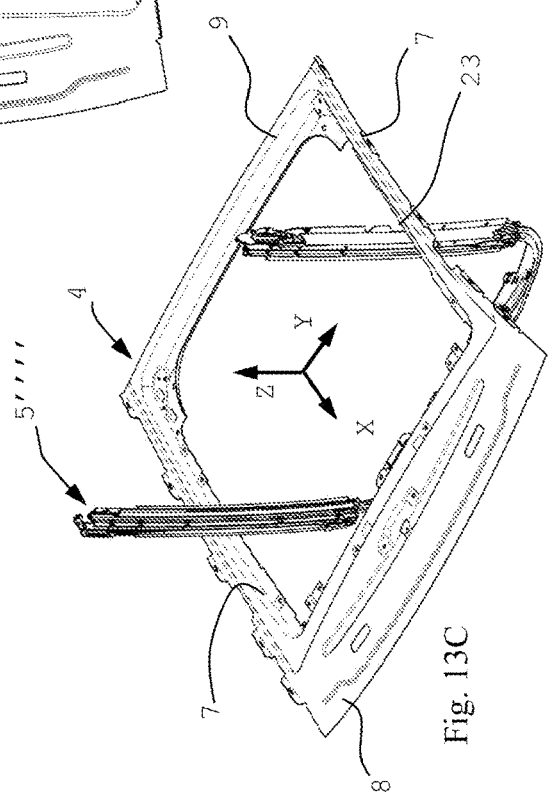

FIGS. 11, 12 and 13 show a further way of inserting drive system 5"" into the space between beams 7, 8 and 9. In this case it is not the flanges 19 of frame 4 that have a recess, but flanges 18 of drive system 5"" have a recess 23 used to position drive system 5"". Drive system 5"" is inserted into the space in a vertical position, but rotated around a vertical (Z) axis, so that guide rails 12 are close to the corner between beams 7, 8 and 7, 9 respectively. Drive system 5"" is moved into the space to such extent that recess 23 is at the height of horizontal flanges 19 of frame 4. Drive system 5"" is then able to be rotated around the vertical axis to a position parallel to beams 8, 9 and then rotated around a horizontal transverse axis (Y) to a position in which flanges 18 and 19 are parallel. In this case the distance between flanges 19 of frame 4 is larger than the distance between the bottoms of recesses 23 in flanges 18 of guide rails 12. Again, flange 18 and/or 19 must be adapted to allow a below/above position.

Figure 14B:
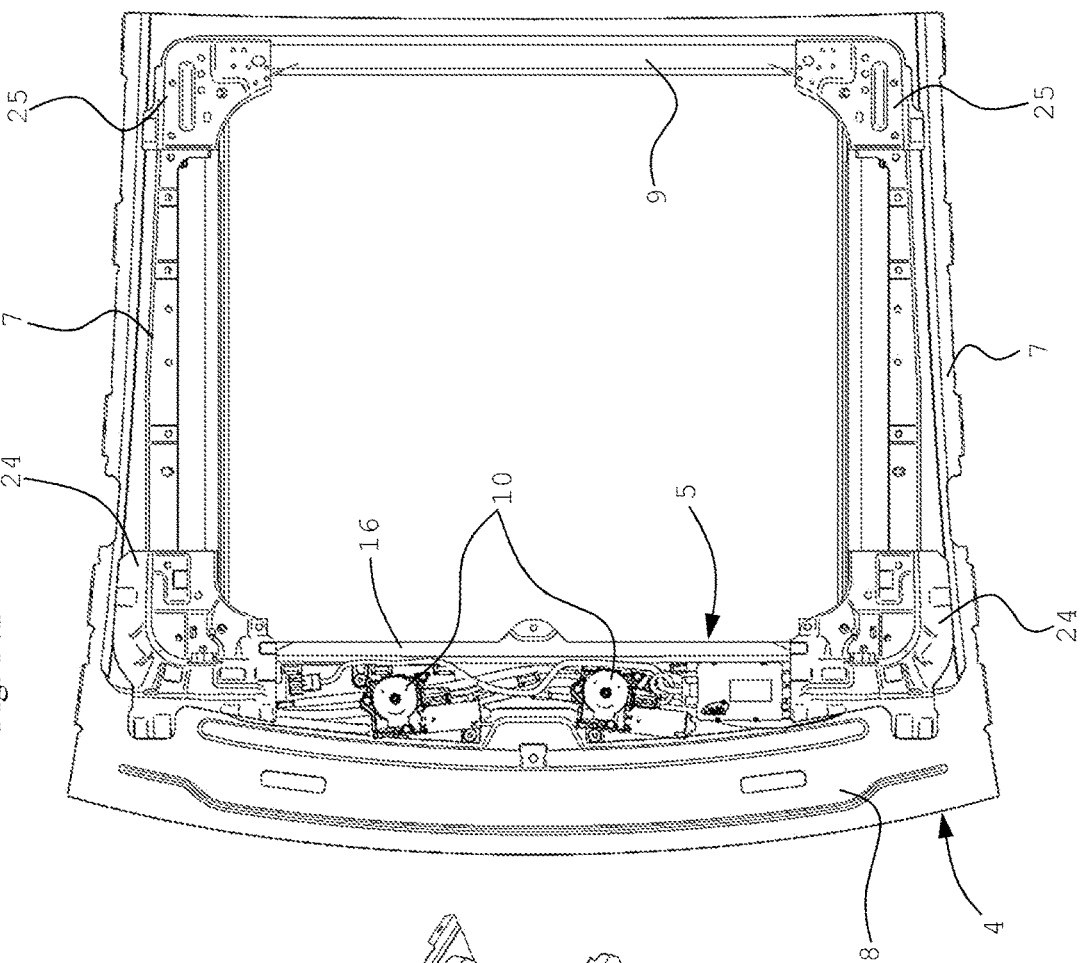
FIGS. 14a and 14b show an exploded view from below and a larger bottom view of a frame having enforcing corner pieces.
Figure 14A:
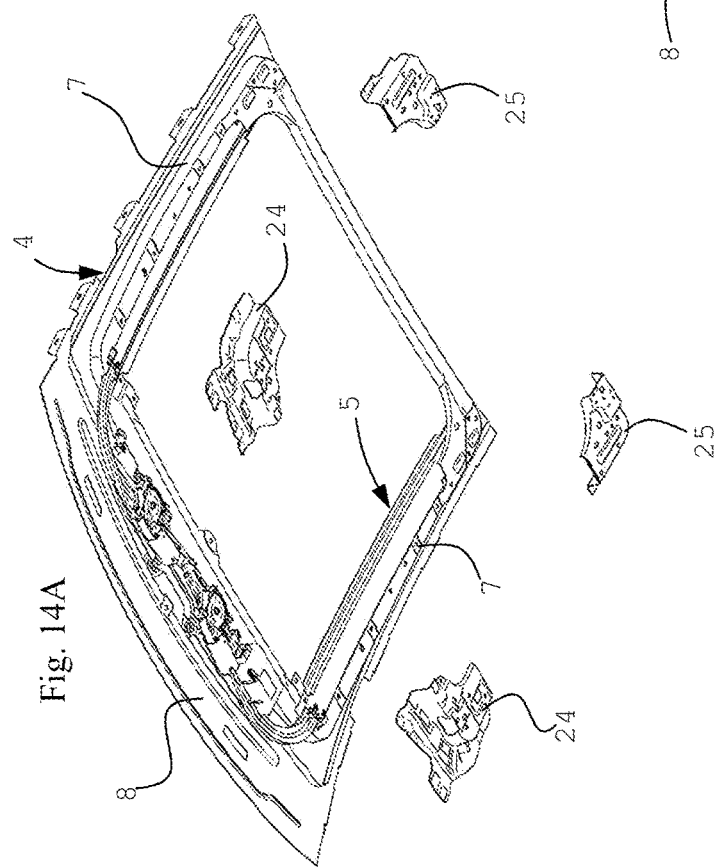

FIGS. 14a and 14b show frame 4 and drive system 5 in assembled condition. FIG. 14a show additional reinforcing corner pieces 24, 25 which are mounted into position in FIG. 14b. These reinforcing corner pieces 24, 25 are used to restore or increase the strength/rigidity of frame 4, for example due to removal of material of frame 4 to allow the particular assembly of drive system 5 and frame 4. For example to allow passage of cable guides 17, downwardly suspended flange or edge 29 of transverse beam 8 and/or 9 may be interrupted by recess or interruption 20, which reduces the rigidity of these beams 8, 9. However, it is noted that this manner of mounting drive system 5 in frame 4 hardly reduces strength of frame 4 near rear beam 9.

Figure 15A:
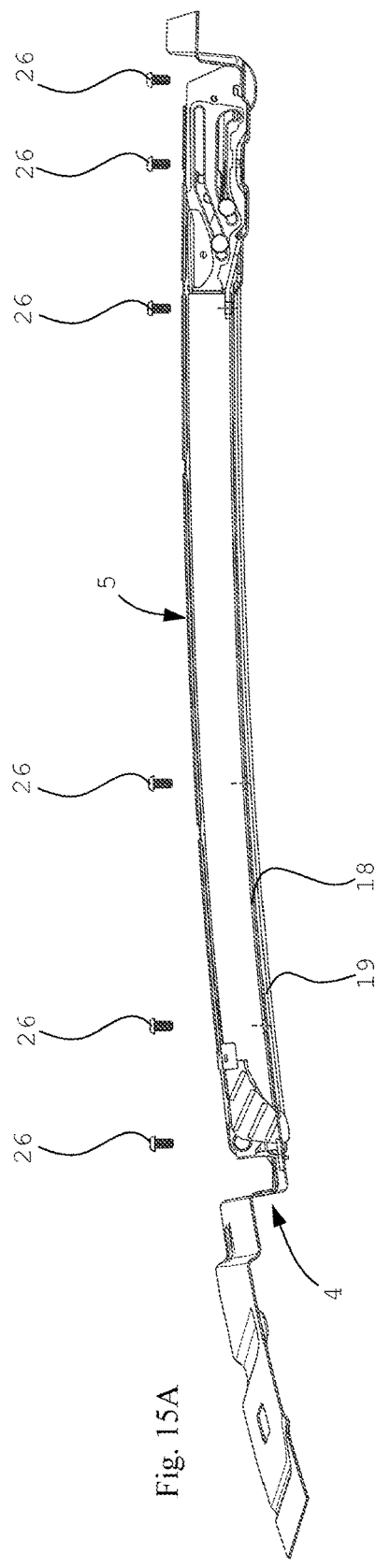
FIGS. 15a and 15b are a longitudinal sectional view and front view of a frame and drive system showing separate fasteners to assemble the drive system and the frame, in a first assembling option.
Figure 15B:
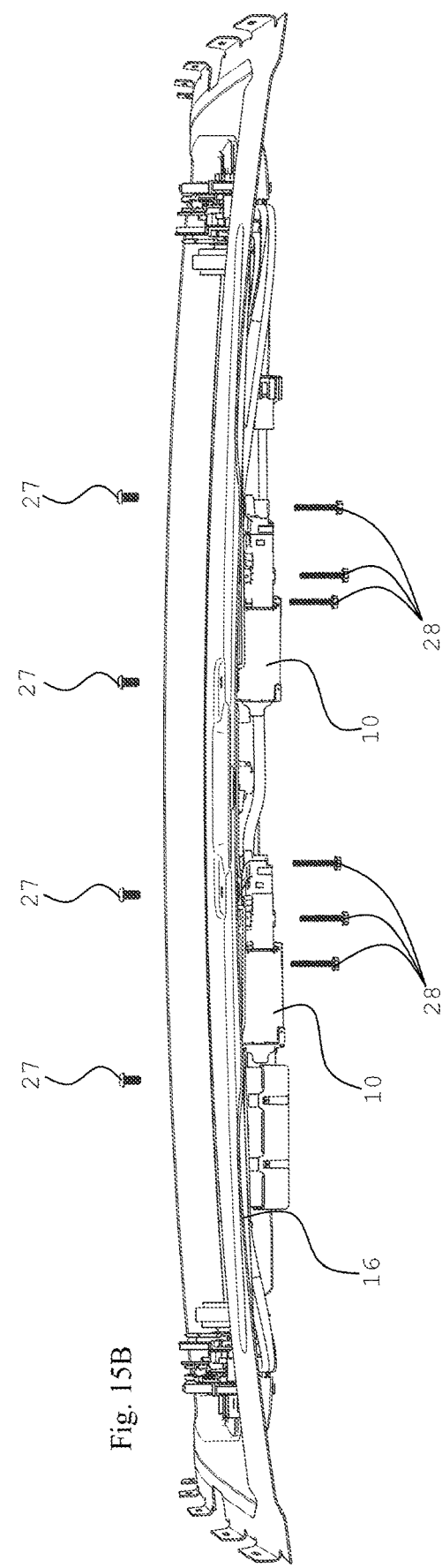
Figure 16A:
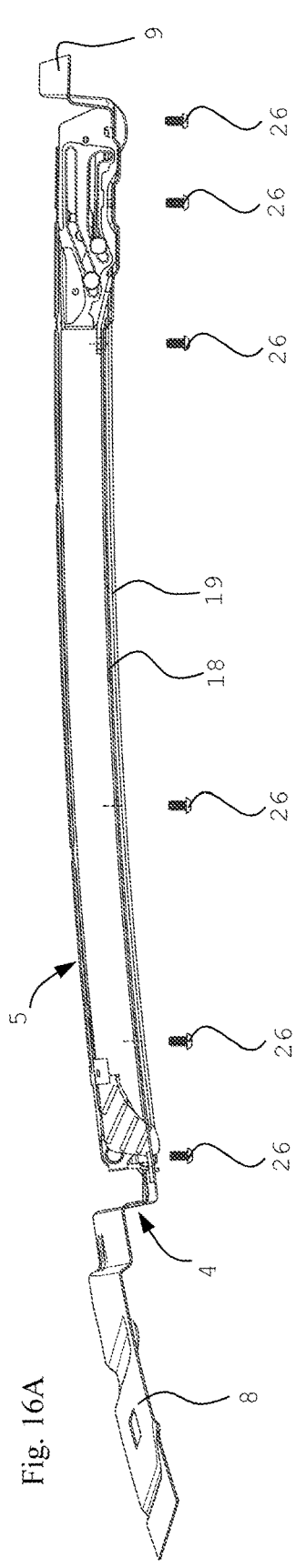
FIGS. 16a and 16b are views similar to that of FIGS. 15a and 15b, but showing a second assembling option.
Figure 16B:
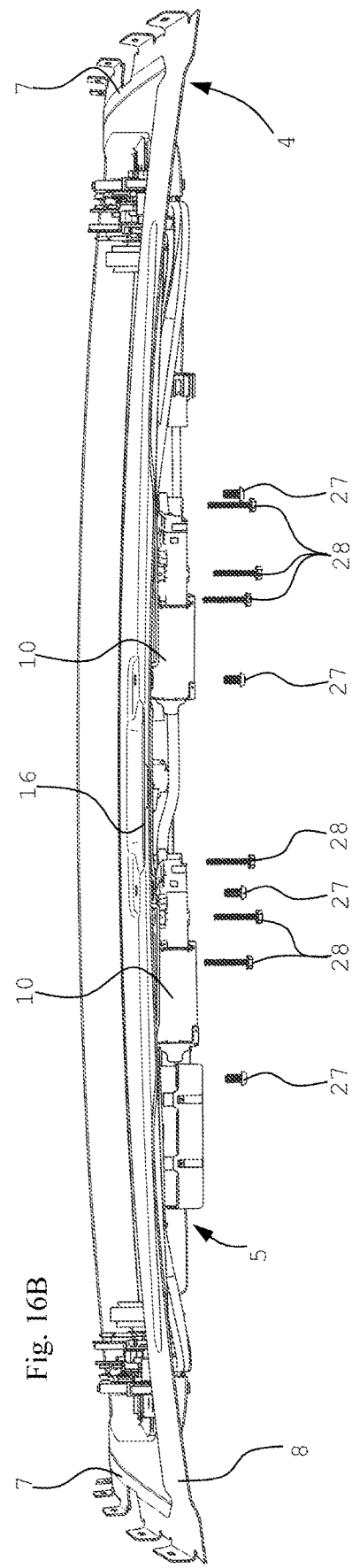

FIGS. 15 and 16 show two embodiments of fastening drive system 5 to frame 4. In the embodiment of FIG. 15 all screws 26 to fasten flanges 18 of drive system 5 to flanges 19 of frame 4 are inserted and tightened from above, and so are screws 27 to fasten front member 16 of drive system 5 to front beam 8. Screws 28 to fasten drive motors 10 to front member 16 are always inserted and tightened from below to ensure the possibility of service from below.

This latter is therefore also the case in the embodiment of FIG. 16, where also screws 26 and 27 are inserted and tightened from below.

Figure 17:
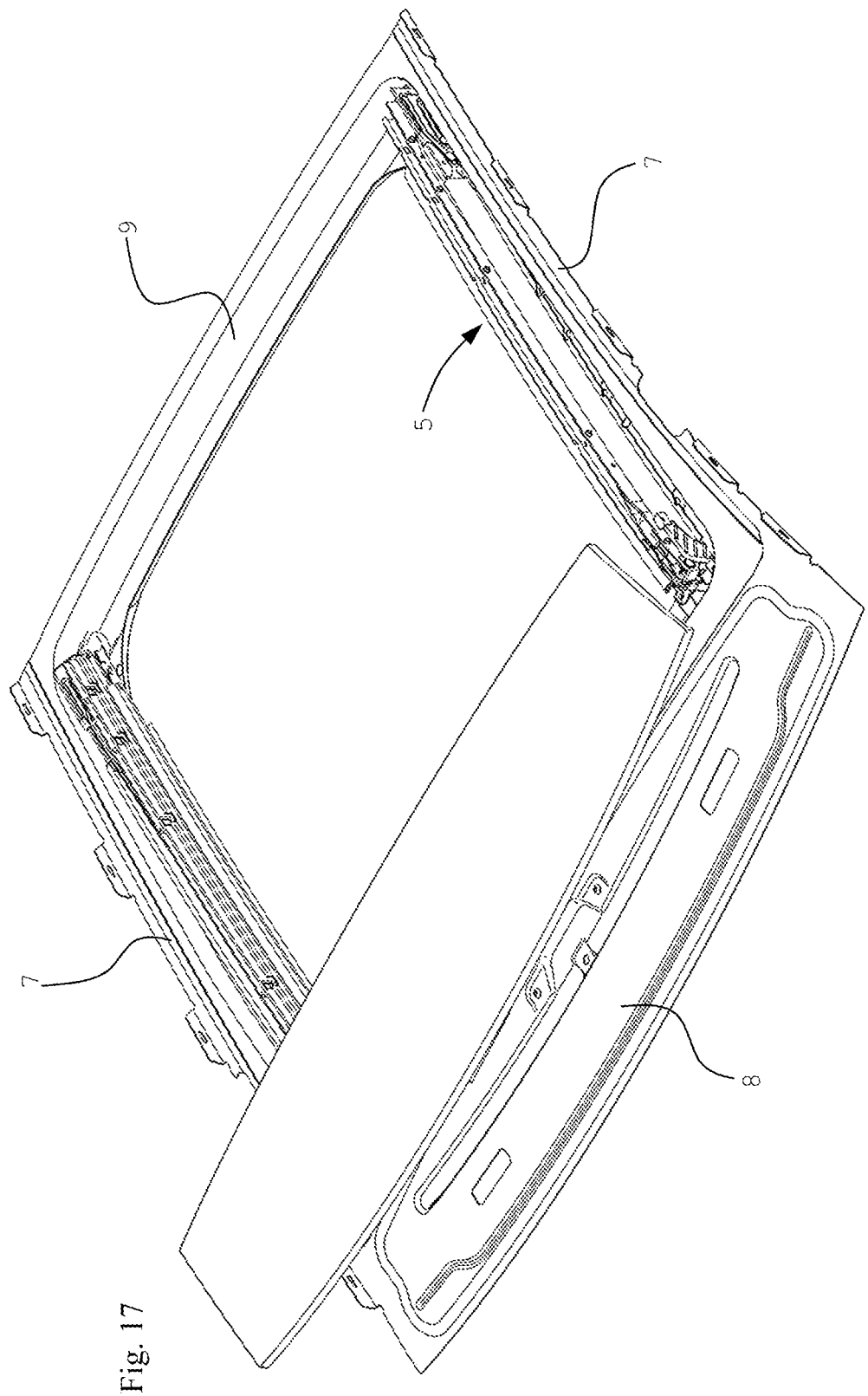
FIG. 17 is an exploded view of a frame and front header.

FIG. 17 illustrates the step of mounting header 6 to front beam 8. In case header 6 should be mounted to front beam 8 when screws 27 are inserted as shown in FIG. 15, then header 6 can only be mounted after screws 27 have been inserted and tightened. In the situation according to FIG. 16 where screws 27 are inserted from below, then header 6 can be mounted before or after screws 27 are in place. Header 6 can be glued to front beam 8 but also other mounting means can be used, preferably such that nothing of the mounting means is visible on the top side of header 6.

In the drawings, the front and rear support 14, 15 of drive systems 5 are shown in a position in which panel 3 would be closed. It is however possible to position the adjustable supports 14, 15 in a position to open panel 3. This allows for immediate mounting of panel 3 after mounting of drive system 5 as panel 3 is always mounted in its open position in embodiments in which panel screws are hidden behind guide walls if panel 3 is in its closed position.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims. Aspects of the various embodiments can be used in other combinations. The drive system may be such that the one or more drive motors are mounted on a rear member (to be) positioned below the rear beam of the frame. The frame may also have more than two transverse beams.

What is claimed is:

1. A roof assembly for a vehicle having an opening in its roof part, comprising:
    a frame having at least a transverse beam and two substantially parallel longitudinal beams connected to opposite ends of the transverse beam,
    a closure configured to close and at least partially open said opening, and
    a drive system for the closure, configured to support and move the closure and including:
        a drive motor attached to the transverse beam,
        two substantially parallel guide rails attached to the longitudinal beams, and
        a support mechanism movably guided in the guide rails and operatively connected to the drive motor by elongated connecting members, said drive system forming a preassembled unit attached to the frame, wherein the frame and the drive system are adapted to each other such that the drive system is partly inserted into the frame between the longitudinal beams and rotated such that the drive motor is positioned on a lower side of the transverse beam of the frame and the guide rails at least partly positioned on a portion of an upper side of the longitudinal beams of the frame.

2. The roof assembly of claim 1, wherein the drive system is mounted to the frame by mounting members inserted from an upper side of the frame.

3. The roof assembly of claim 2, wherein the mounting members are screws inserted and tightened from the upper side of the frame.

4. The roof assembly according to claim 1, wherein a width of the drive system beyond the guide rails at a position of the drive motor is smaller than the width of the drive system at the guide rails.

5. The roof assembly according to claim 4, wherein the transverse beam has a downwardly suspended edge at a side of the transverse beam adjacent the longitudinal beams, and this edge is interrupted by an interruption to allow passage of at least a part of the elongated connecting members of the drive system.

6. The roof assembly of claim 1, wherein the longitudinal beams each have a recess on their edges facing each other to allow perpendicular passage of the drive system, and wherein a flange of the guide rails is on the upper side of a flange of the longitudinal beams on a side of the recesses remote from the transverse beam under which the drive motor is positioned.

7. The roof assembly of claim 1, wherein flanges of the guide rails of the drive system have recesses in their edges facing away from each other such that a smallest distance between the recesses of the two guide rails is smaller than a smallest distance between facing edges of the two longitudinal beams of the frame.

8. A method of assembling a roof assembly for a vehicle having an opening in its roof part, said roof assembly comprising a frame having at least a transverse beam and two substantially parallel longitudinal beams connected to opposite ends of the transverse beam, a closure which is movable between an closed position closing the opening and an open position, and a drive system for the closure supporting and moving the closure, including a drive motor, two substantially parallel guide rails, a support mechanism to be movably guided in the guide rails and operatively connected to the drive motor by elongated connecting members, said method comprising:
    assembling parts of the drive system into a preassembled drive system,
    mounting the preassembled drive system to the transverse and longitudinal beams of the frame, such that the drive motor is attached to the transverse beam and the guide rails are attached to the longitudinal beams of the frame,
    wherein the preassembled drive system is attached to the frame by:
        moving the preassembled drive system to the frame under an angle,
        moving the preassembled drive system partially into a space between the longitudinal and transverse beams, rotating the preassembled drive system at least around a transverse axis of rotation such that the drive motor is positioned below the transverse beam and the guide rails are positioned at least partially above a portion of the longitudinal beams.

9. The method of claim 8, wherein the preassembled drive system is moved into the space between the longitudinal and transverse beams from an upper side of the frame and with the drive motor first.

10. The method of claim 9, wherein the preassembled drive system is moved into the space between the longitudinal and transverse beams at a position near the transverse beam.

11. The method of claim 8, wherein the preassembled drive system is moved into the space between the longitudinal and transverse beams from a lower side of the frame and with ends of the guide rails away from the drive motor first.

12. The method of claim 11, wherein the preassembled drive system is moved into the space between the longitudinal and transverse beams at a position spaced from the transverse beam.

13. The method of claim 8, wherein the preassembled drive system is attached to the frame by mounting members manipulated from an upper side of the frame.

14. The method of claim 8, wherein the preassembled drive system is moved into the space between the longitudinal and transverse beams with the support mechanism in a position in which the closure would be in the open position.

15. The method of claim 8, wherein the closure is mounted to the support mechanism of the preassembled drive system before it is moved into the space between the longitudinal and transverse beams.

* * * * *